(12) United States Patent
Baker et al.

(10) Patent No.: US 10,221,519 B2
(45) Date of Patent: Mar. 5, 2019

(54) WATER-REPELLANT CONDUCTIVE FABRICS AND METHODS FOR MAKING THE SAME

(71) Applicant: FOWNES BROTHERS & CO., INC., New York, NY (US)

(72) Inventors: Timothy James Baker, Gloversville, NY (US); Even James Dunlop, New York, NY (US)

(73) Assignee: Fownes Brothers & Co., Inc., New York, NY (US)

( * ) Notice: Subject to any disclaimer, the term of this patent is extended or adjusted under 35 U.S.C. 154(b) by 473 days.

(21) Appl. No.: 14/566,623

(22) Filed: Dec. 10, 2014

(65) Prior Publication Data
US 2016/0168785 A1    Jun. 16, 2016

(51) Int. Cl.
| | |
|---|---|
| D06M 11/74 | (2006.01) |
| D06N 7/00 | (2006.01) |
| D06M 23/00 | (2006.01) |
| G06F 3/01 | (2006.01) |
| G06F 3/039 | (2013.01) |

(52) U.S. Cl.
CPC ............ *D06M 11/74* (2013.01); *D06M 23/00* (2013.01); *D06N 7/0094* (2013.01); *G06F 3/014* (2013.01); *G06F 3/039* (2013.01); *D06M 2200/12* (2013.01); *D06N 2209/041* (2013.01); *D10B 2401/021* (2013.01); *D10B 2401/16* (2013.01); *D10B 2501/041* (2013.01)

(58) Field of Classification Search
None
See application file for complete search history.

(56) References Cited

U.S. PATENT DOCUMENTS

| | | |
|---|---|---|
| 2,279,094 A | 4/1942 | Siers |
| 2,287,744 A | 6/1942 | Monahan |
| 2,305,542 A | 12/1942 | Mason |
| 2,756,165 A | 7/1956 | Lyon |
| 2,879,452 A | 3/1959 | Page |
| 3,007,083 A | 10/1961 | MacQuaid, Jr. et al. |
| 3,148,083 A | 9/1964 | Herrick |
| 3,541,389 A | 11/1970 | Van Name |
| 3,695,988 A | 10/1972 | Heinz |
| 3,817,820 A | 6/1974 | Smith, II |
| 3,901,929 A | 8/1975 | Cote |
| 4,077,853 A | 3/1978 | Coll-Palagos |

(Continued)

FOREIGN PATENT DOCUMENTS

| | | |
|---|---|---|
| CN | 1346912 | 5/2002 |
| CN | 2568684 | 8/2003 |

(Continued)

OTHER PUBLICATIONS

UV Process Supply, Inc. "Proper Dyne Testing: How, Why and When to Perform" 2005.*

(Continued)

*Primary Examiner* — Robert S Walters, Jr.
(74) *Attorney, Agent, or Firm* — Robert W. Morris; Ojeiku C. Aisiku; Eckert Seamans Cherin & Mellott, LLC

(57) ABSTRACT

Water repellant conductive fabrics and methods for making the same are provided. The water repellant conductive fabrics may have a conductivity suitable to operate touch-sensitive electronic devices without a conductive path to the human body.

8 Claims, 4 Drawing Sheets

(56) References Cited

U.S. PATENT DOCUMENTS

| | | |
|---|---|---|
| 4,259,854 A | 4/1981 | Knyazeva |
| 4,344,762 A | 8/1982 | Monsheimer |
| 4,751,750 A | 6/1988 | Tepley |
| 4,850,838 A | 7/1989 | Wagner et al. |
| 5,153,067 A | 10/1992 | Yoshida et al. |
| 5,503,754 A | 4/1996 | Counts |
| 5,716,893 A | 2/1998 | Child |
| 5,993,560 A | 11/1999 | Wasak et al. |
| 6,001,749 A | 12/1999 | Child et al. |
| 6,022,383 A | 2/2000 | Kuwabara |
| 6,277,439 B1 | 8/2001 | Painter |
| 6,716,481 B2 | 4/2004 | DeAngelis et al. |
| 7,662,461 B2 | 2/2010 | Xia et al. |
| 7,824,737 B2 | 11/2010 | Xia et al. |
| 7,872,069 B2 | 1/2011 | Xia et al. |
| 8,062,540 B2 | 11/2011 | Sugimoto et al. |
| 2002/0035755 A1 | 3/2002 | Widdemer |
| 2002/0132905 A1 | 9/2002 | Babinee et al. |
| 2003/0077394 A1 | 4/2003 | Bradford et al. |
| 2003/0211320 A1 | 11/2003 | Thompson et al. |
| 2003/0214161 A1 | 11/2003 | Seto et al. |
| 2004/0063366 A1 | 4/2004 | Nakayama et al. |
| 2004/0253404 A1 | 12/2004 | Wang et al. |
| 2005/0008861 A1 | 1/2005 | Yadav et al. |
| 2005/0271566 A1 | 12/2005 | Yadav |
| 2005/0271881 A1 | 12/2005 | Hong |
| 2006/0231320 A1 | 10/2006 | Kamizono et al. |
| 2007/0154507 A1 | 7/2007 | Patton et al. |
| 2007/0155855 A1 | 7/2007 | Hees |
| 2008/0068773 A1 | 3/2008 | Ober et al. |
| 2008/0299406 A1 | 12/2008 | Lee |
| 2008/0305300 A1 | 12/2008 | Suto et al. |
| 2009/0075019 A1 | 3/2009 | Loos |
| 2009/0205142 A1 | 8/2009 | Vorlander |
| 2010/0281622 A1 | 11/2010 | Sugimoto |
| 2011/0252580 A1 | 10/2011 | Miller et al. |
| 2011/0283533 A1 | 11/2011 | Perelaer et al. |
| 2012/0128995 A1* | 5/2012 | Leto .................. C09D 175/04 428/473 |
| 2012/0237783 A1 | 9/2012 | Leto |

FOREIGN PATENT DOCUMENTS

| | | |
|---|---|---|
| CN | 1978670 | 6/2007 |
| CN | 1978671 | 6/2007 |
| CN | 101240508 | 8/2008 |
| DE | 2147904 | 3/1973 |
| DE | 3447205 | 7/1986 |
| DE | 3922300 | 11/2006 |
| DE | 202006007724 | 11/2006 |
| EP | 0162645 | 11/1985 |
| EP | 0511694 | 11/1992 |
| EP | 0392352 | 9/1994 |
| GB | 557070 | 11/1943 |
| GB | 674630 | 6/1953 |
| GB | 749824 | 6/1956 |
| GB | 853186 | 11/1960 |
| GB | 1112711 | 5/1968 |
| GB | 1327586 | 8/1973 |
| GB | 1593510 | 7/1981 |
| JP | 5-331500 | 12/1993 |
| JP | 6-192969 | 7/1994 |
| JP | 10-212737 | 8/1998 |
| WO | 90/01249 | 8/1990 |
| WO | 2005/100616 | 10/2005 |
| WO | 2009/034037 | 3/2009 |
| WO | 2009/150681 | 12/2009 |
| WO | 20101141743 | 12/2010 |
| WO | WO2010/141743 | 12/2010 |

OTHER PUBLICATIONS

Selvaraj et al. "Electrofinishing of Porous Non-Conductors Such as Leather." Plating and Surface Finishing, 63:8, pp. 30-35, Aug. 1976.
Pocket Book for the Leather Technologist, BASF Performance Chemicals, Jan. 22, 2007.
Surface Active Agents, Manual of Symbols and Terminology for Physiochemical Quantities and Units, IUPAC, http://old.iupac.org/reports/2001/colloid_2001/manual_of_s_and_t/node36.html, 2002, p. 1.
Leather, Eckhardt Heidemann, Ullmann's Encyclopedia of Industrial Chemistry Published Online Apr. 30, 2005, http://onlinelibrary.wiley.com/doi/10.1002/14356007.a15_259.pub2/abstract, Retrieved on Dec. 29, 2016. p. 1-44.

* cited by examiner

WATER-REPELLANT CONDUCTIVE FABRICS AND METHODS FOR MAKING THE SAME

FIELD

This is generally related to water-repellant conductive fabrics and methods for making them, and articles of clothing made from the water-repellant conductive fabrics.

BACKGROUND

The wide-spread use of touch-screen devices continues to explode. Smart phones, for example, are becoming lighter, thinner, but more powerful and capable on almost a daily basis. In addition, tablet electronics are also becoming ubiquitous, in part, because of the varying sizes that accommodate each user's particular needs. The input to the touch-screen on these devices is controlled by a series of finger gestures that manipulate images on the display. While there are different display technologies for interpreting the gesture inputs, one of the most common are capacitive touch-screens which take some of the charge stored in fingers to activate the screen to detect the gestures. In cold weather, however, when the user wears gloves to keep warm, capacitive touch-screens are difficult to operate. One solution to such a problem is the use of fabrics and other materials that are processed such that at least a portion of the surface of the glove is electrically conductive.

The use of electrically conductive fabrics and textiles is well known in the art. These materials can be found in a wide variety of uses, such as anti-static, anti-microbial, and functional cloth applications.

For example, Child U.S. Pat. No. 5,716,893 discloses a method of depositing a conductive polymer film on a textile fabric substrate. The method includes synthesizing a pyrrole compound having improved stability by the oxidative polymerization of an aqueous solution of a pyrrole compound in the presence of an oxidizing agent, dopant anion and a stabilizing agent.

Another example is Child et al. U.S. Pat. No. 6,001,749, which discloses a patterned conductive textile and a process for making the same. The process involves applying a durable finish to portions of the chosen substrate that inhibits the formation of a conductive polymer from forming on those areas.

Still another example is DeAngelis et al. U.S. Pat. No. 6,716,481, which discloses a process for making an electromagnetically conductive textile having a conductivity gradient through the thickness of the fabric. The process includes two or more superimposed webs of felt material with different electrical conductivities in order to create an conductivity gradient across the composite fabric's thickenss.

A further example of conductive materials can be found in Leto et al. International Publication No. WO 2010/141743, which discloses materials for use with capacitive touch-screens. The materials include textiles, leathers, non-woven materials, and leather-like materials impregnated with a composition including an electrically conductive agent and a binder. The described process includes curing coatings either under heat or air dried without heat.

Attempts at producing conductive material products have been somewhat successful. For example, Fownes Brothers & Co. has produced a line of touch-screen conductive gloves (see for example, www.urpowered.com) that provide the user with the ability to operate their touch-screen devices without removing the gloves, while the gloves themselves do not have the silver or metallic threads on the fingertips that many found to be undesirable. The conductive nature of these gloves, however, can degrades over time and use particularly due to conditions such as from wetness due to snow, ice, and laundering. This is due, at least in part, to the incompatibility between the process for making fabrics conductive versus making them water repellant. For example, if fabrics are already water repellant, it is very difficult to successfully treat to make them to make them conductive as well. Thus, it would be advantageous to provide high-quality water repellant conductive materials and methods for making the same that overcome the shortcomings of the current state-of-the art.

SUMMARY

Water repellant conductive fabrics and methods for making the same are disclosed. The water repellant conductive fabrics disclosed herein should have a conductivity in the range necessary to operate touch-sensitive electronic devices without relying on a conductive path to the human body (e.g., the silver or metal threads described above). The water repellant conductive fabrics are formed by first incorporating electrically conductive metallic or nonmetallic particles in sufficient quantities to achieve the necessary level of conductivity. Then the electrically conductive fabrics are treated with a water repellant process even though they are still wet from the electrically conductive processing—which can be referred to as a "wet on wet" process versus the traditional "wet on dry" process typically utilized to add water repellant properties to fabrics. In general, the process described herein is counter-intuitive to conventional water repellant processes, at least because "normal" wet materials can act to repel the applied water repellant finish (or vice versa) such that the finish does not adequately adhere to the fibers of the fabrics.

In some embodiments, the starting material may be textiles that have been prepared for receiving one or more surface coatings. This initial preparation may result in fabrics having a surface tension suitable to achieve a level of coating penetration of conductive material that prevents coating removal, therefore, color and conductivity from diminishing over time. Depending on the desired color, conductivity, and selected textile of the finished conductive fabrics, a suitable number of coatings may be applied to the starting material. Once the conductive agents have been applied, the wet materials are then treated with a water repellant process that varies depending on the particular type of fabric used as a starting fabric. The water repellant chemicals can be mixed into a liquor and loaded into an agitating bin, and then the wet, electrically conductive starting fabric can be immersed therein for a given amount to time that is sufficient to insure that the liquor is evenly distributed throughout the individual fibers of the fabric. Once a sufficient amount of time has passed, the fabrics are removed from the bin and dried at relatively high temperature until completely dry. The water repellant conductive fabrics disclosed herein may then be incorporated into articles of clothing such as gloves, hats, or jackets.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION

Capacitive touch-sensitive electronic device displays have become ubiquitous in modern society today. They can be found on smartphones, tablet computing devices, ATMs, and even in cars, among others. These displays, due to their touch-screen nature of operation, also act as user input devices directly on the display screen itself. This allows for powerful, intuitive, and direct control of what is actually displayed on the screen without the need for additional peripheral hardware such as a keyboard, mouse, or stylus. One disadvantage of capacitive touch-sensitive displays is that they require a charge-conducting input mechanism (e.g., the human body) to distort the screen's electrostatic field. Thus, capacitive touch-sensitive displays cannot be controlled by products that are electrically insulating, such as traditional gloves, plastic styluses, etc.

Figure 1:
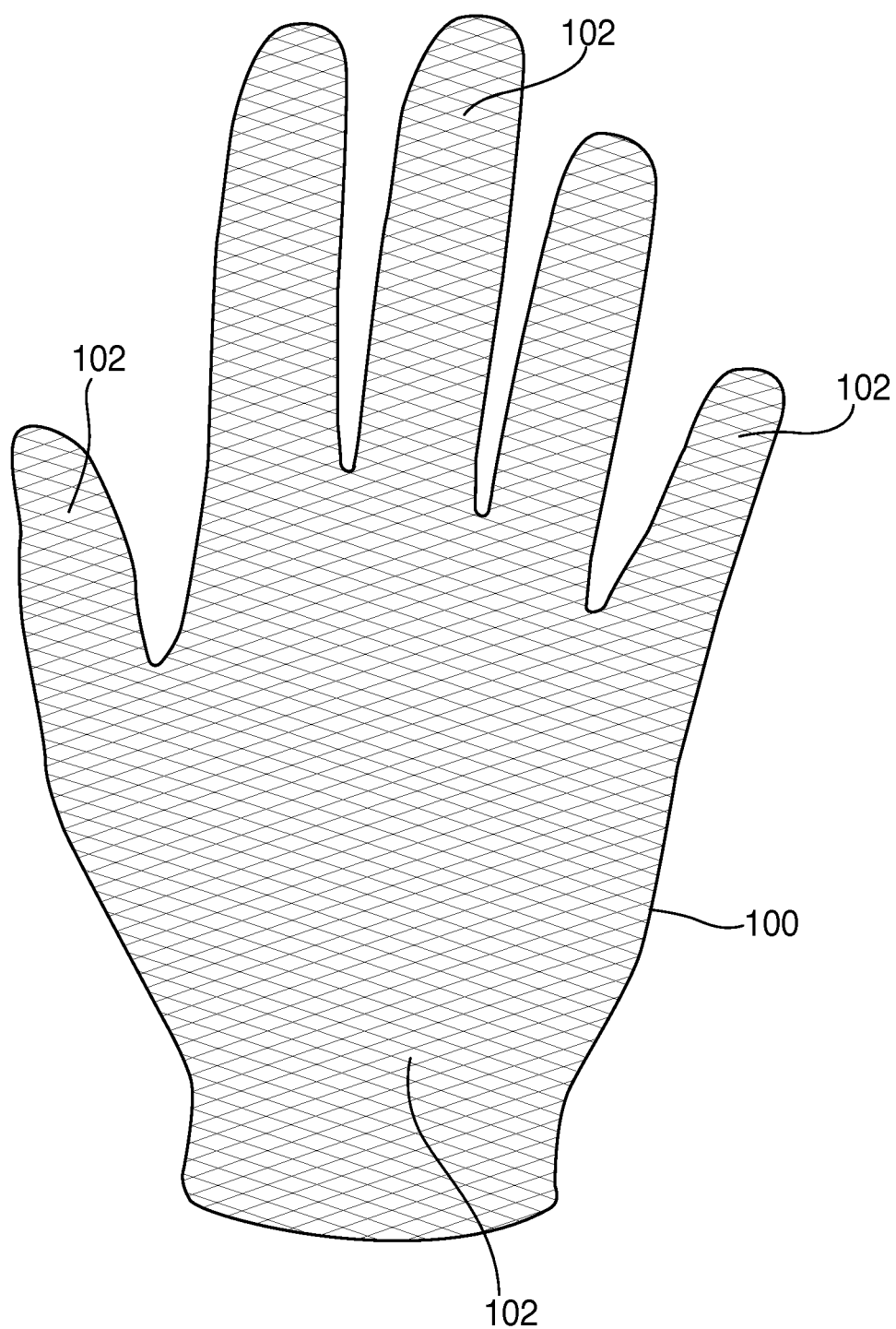
FIG. 1 is an illustrative view of a water repellant conductive fabric glove in accordance with some embodiments.

FIG. 1 is an illustrative view of a water repellant conductive fabric glove 100 that includes numerous fibers 102 which form the material that has been manufactured into fabric glove 100 in accordance with some embodiments. Water repellant conductive glove 100 can be formed from a variety of starting materials including, for example, natural and/or artificial knits and textiles. As illustrated in FIG. 1, each of fibers 102 has been substantially coated first with a conductive material, and then the conductive material is itself coated with a water repellant coating that does not substantially degrade the conductive characteristics of the first coating. This may be more apparent from FIGS. 2-4.

The starting fabric for conductive fabric glove 100, which may be capable of operating capacitive touch-sensitive displays according to some embodiments, may be a fabric that has been drum dyed, processed, and softened and otherwise treated in preparation for receiving one or more of coatings. The pre-processing may be designed to result in a fabric having a surface tension optimized for penetration of the conductive coating and subsequent adhesion. The surface tension may be measured with any suitable method known in the art, including, for example, measuring the amount of time required for the surface of the starting material to wet. Wetting time for optimal surface tension may be, for example, less than 60 seconds.

Figure 2:
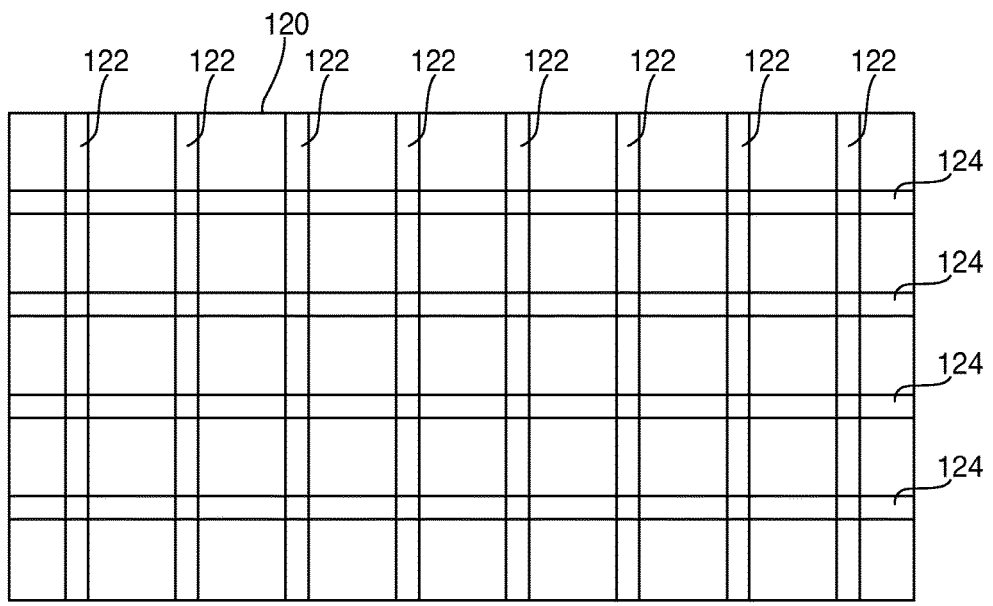
FIG. 2 is a cross-sectional illustrative view of a portion of a starting fabric prior conductive treatment.

FIG. 2 is an illustrative, close-up, cross-sectional view of a portion of conductive fabric material 120. Conductive fabric 120 is formed from a series of fibers 122 that have been knit or woven together with fibers 124. As shown in FIG. 2, the individual fibers 122 and 124 of conductive fabric 120 have not yet been treated with the conductive material. While the application of the conductive material, however, can occur through a variety of processes that are well-known, it should be noted that it may be difficult, if not impractical, using currently known technology, to apply the conductive material to fabric 120 if fabric 120 itself is already water repellant. In such instances, the coating process may not result in enough conductive material adhering to individual fibers 122 and 124, such that touch-screen operation may be unreliable.

It should also be noted that attempts to process fabrics using "traditional" methods have resulted in fabrics that appeared to be deficient, either in their conductive attribute, their water repellant attribute, or even both. As used herein, "traditional" is intended to refer to processes in which a first coating (i.e., conductive) is applied to a fabric and then the fabric is dried. Once the coated fabric has dried, the dried fabric 120 is then placed in a liquor which includes a water repellant substance that is intended to coat individual fibers 122 and 124 of fabric 120. One reason why this "wet on dry" method is "traditionally" utilized is to try to avoid the second coating from washing off the first coating. Unfortunately, the "wet on dry" process has often resulted in fabrics with inferior operational characteristics. This may occur because the dried conductive coating may itself repel or otherwise cause the water repellant coating to not adhere.

The electrically conductive particles themselves can be particulates of electrically conducting metals such as iron, cobalt, nickel, copper, palladium, silver, platinum, gold, or any other suitably conductive metal or metallic alloy. Alternatively, the electrically conductive particles may be non-metallic, such as coating made of carbon-based products such as carbon nanotubes. Furthermore, the electrically conductive particles may include conductive or nonconductive particles coated with any of the above metals.

The electrically conductive particles can be, for example, any suitable electrically conducting polymer such as poly (3,4-ethylenedioxythiophene), poly(fluorene)s, polyphenylenes, polypyrenes, polyazulenes, polynaphthalenes, poly (pyrrole)s, polycarbazoles, polyindoles, polyazepines, polyanilines, poly(thiophene)s, or poly(p-phenylene sulphide).

Moreover, as described above, the electrically conductive particles can be, according to still further embodiments, any suitable electrically conducting carbon-based material such as graphite, graphene, carbon nanotubes, or carbon black.

The initial conductive coating mixture may also include one or more dispersing agents (e.g., non-ionic, anionic, cationic and/or amphoteric surfactants), aqueous based acrylics and/or polyurethane resins, binders, fillers and waxes, water miscible solvents, and/or water. These mixtures may help the conductive coating adhere to fibers 122 and 124.

Any suitable number of coatings may be applied to fabric 120 in order to build up the required level of inherent capacitance in the finished product. For example, depending on the desired conductivity of the conductive leather material, fabric 120 may include 2-4 coatings of the initial conductive coating mixture. Each of the initial coatings may be identical, or, according to some embodiments, the initial coating mixture may be varied slightly from coating to coating in order to achieve optimal penetration and adhesion of each coating.

In general, each coating may be applied to the surface of the fabric by means of spraying, roller coating, padding, curtain coating, or any other process currently known in the art or later developed. Depending on the application method, wet application levels for each coating of the base layer may be between 0.253-0.75 g/ft.

After the coating(s) have been applied to fabric 120, the wet coated fabric is removed, in accordance with some embodiments, for further processing prior to being allowed to dry. Following application of the conductive coating to fabric 120, the sheet resistance of the conductive fabric may be less than $10^3$ Ω-sq.

Figure 3:
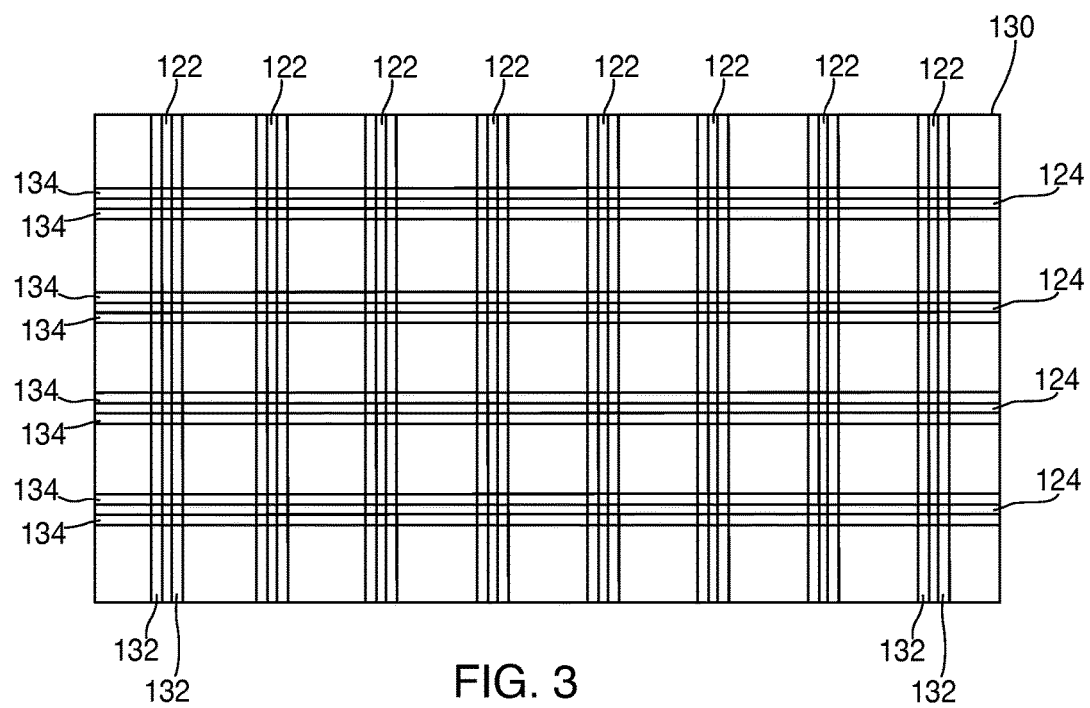
FIG. 3 is a cross-sectional illustrative view of a portion of a starting fabric following treatment of conductive material in accordance with some embodiments.

FIG. 3 shows an illustrative close-up cross-sectional view of fabric 130. Fabric 130 is substantially the same fabric as was illustrated in FIG. 2, such that it includes fibers 122 and 124, but in the case of what is shown in FIG. 3, fibers 122 and 124 have been coated with conductive coating 132 and 134, respectively. Conductive coatings 132 and 134 provide fabric 120/130 with the required sheet resistance such that a glove made of conductive fabric 130 could be used to effectively operate a touch-screen device without any direct contact with the skin of the person wearing the glove. Moreover, for purposes of illustration, FIG. 3 represents a closer view of fabric 120/130 than was shown in FIG. 2.

Figure 4:
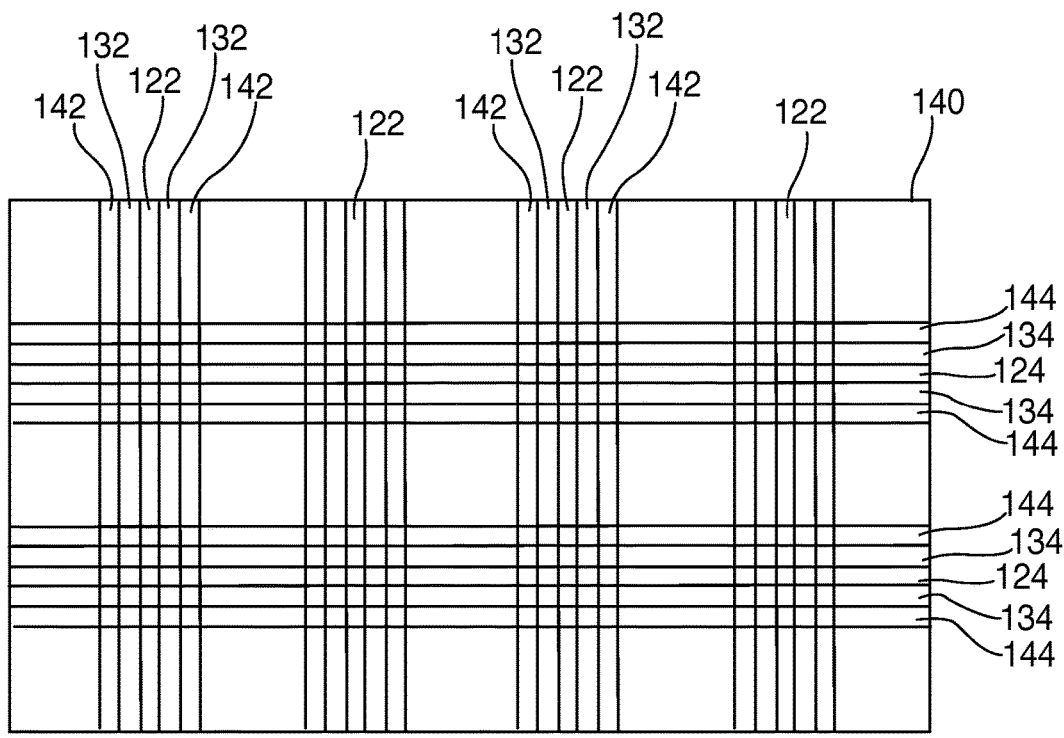
FIG. 4 is a cross-sectional illustrative view of a portion of a conductive starting fabric following treatment of water repellant material in accordance with some embodiments.

FIG. 4 shows another illustrative, close-up, cross-sectional view of fabric 140. In FIG. 4, fabric 120/130 has been coated with a conductive coating and the coated fabric 130 has been processed while wet such that water repellant coatings 142 and 144 form on top of coatings 132 and 134, respectively. While FIG. 4 shows conductive coatings 132 and 134 as being separate and distinct from water repellant coatings 142 and 144, by processing conductive fabric 130 while wet, it is expected that the two coatings may become intermixed to some extent. This may provide fabric 120/130/140 with superior and long-lasting conductive and water repellant characteristics. In fact, the conductive and/or water repellant characteristics may be more reliable and/or long-lasting together than the individual characteristics would have been if applied alone.

Figure 5:
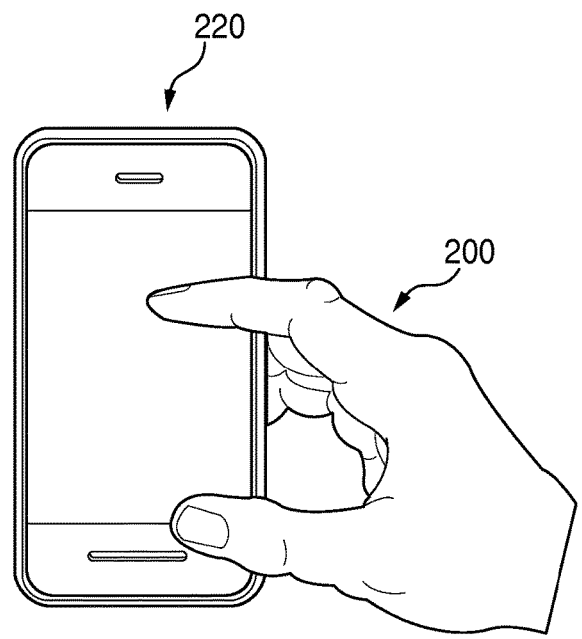
FIG. 5 is a perspective view of a conductive fabric glove for interacting with a capacitive touch-sensitive electronic device in accordance with some embodiments.

FIG. 5 is an illustrative perspective view of a conductive fabric glove 200 interacting with a capacitive touch-sensitive electronic device 220 in accordance with some embodiments. Conductive fabric glove 200 may be assembled using, for example, conductive fabric 120 described above. According to some embodiments, all of the fabric used to assemble conductive fabric glove 200 may be conductive fabric. In other embodiments, however, typical non-conducting fabrics and/or leather may be used for some parts of conductive fabric glove 200. For example, because a user will typically operate capacitive touch-sensitive electronic device 220 with his or her fingertips, typical non-conductive materials may be used for the portion of the glove corresponding to the back of the user's hand, such as a leather exterior and fabric touch-screen capable interior. In some other embodiments, conductive fabric may be used only for the finger portions of conductive fabric glove 200. The total amount of conductive fabric used for conductive fabric glove 200 may depend on the conductivity of the conductive fabric used and the capacitive requirements of capacitive touch-sensitive electronic device 220.

Figure 6:
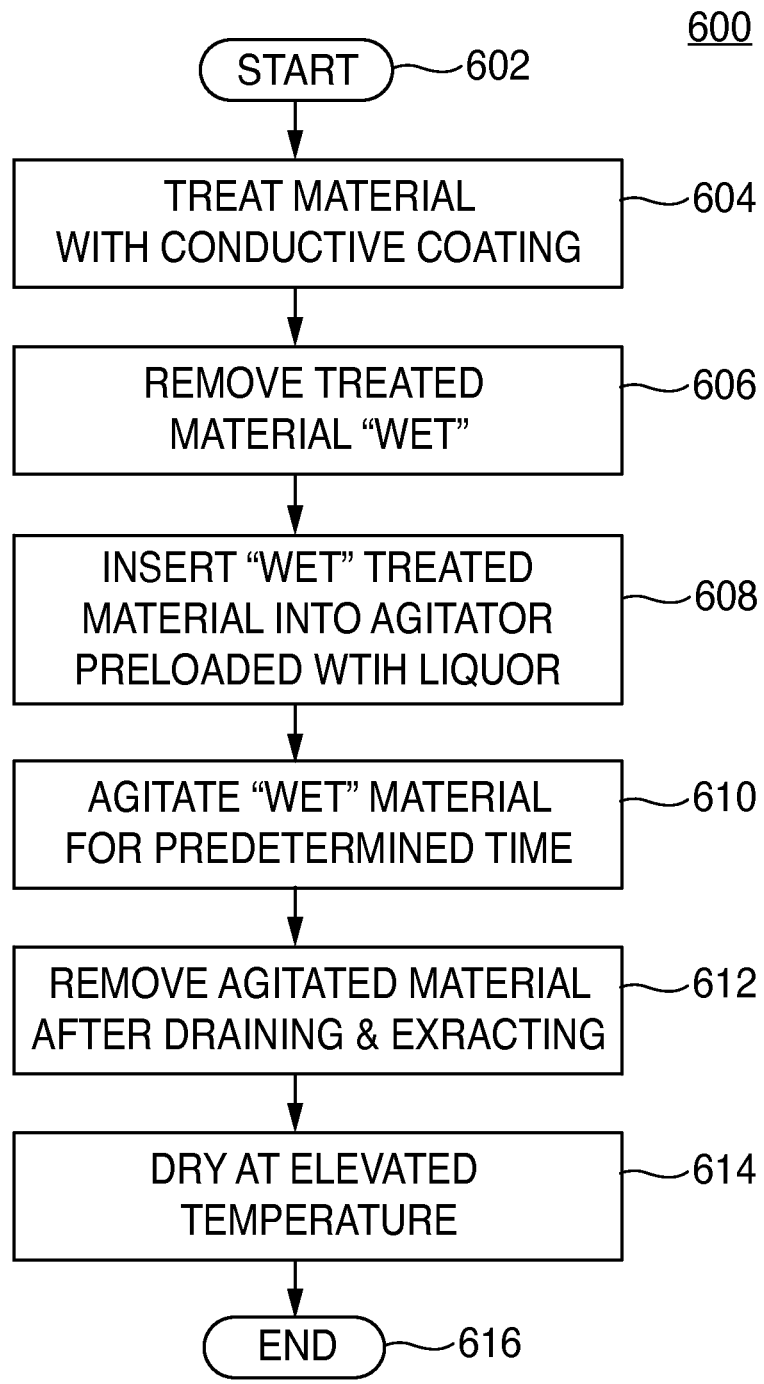
FIG. 6 is an illustrative flow diagram of a method for making conductive water repellant fabrics in accordance with some embodiments.

FIG. 6 shows an illustrative method 600 for coating fabrics in accordance with some embodiments. Process 600 begins at step 602. In step 604, the fabric is treated with a conductive coating such that individual fibers of the fabric are coated with the conductive material, which may be metallic or non-metallic, as described above. Once the conductive coating process has been completed, in step 606, the coated fabric is removed wet and, in general, is further processed without permitting the fabric to dry.

Next, in step 608, the wet conductively coated fabric is inserted into a processing device having agitation capabilities, such as a washer, which may have been preloaded with a liquor containing at least a portion of water repellant material. In fact, it may be preferable to utilize a liquor ratio of at least five to one whereby the water repellant added to the liquor is maintained at approximately 0.5% weight of the liquor. For example, if 100 pounds of fabric is being treated, the agitation device should have 500 pounds of liquor which may include approximately 2.5 pounds of water repellant material. Then, in step 610, the device agitates the fabric within the liquor at ambient temperature for a predetermined amount of time. For example, the device may agitate the fabric in the liquor at ambient temperature for at least 15 minutes. In some embodiments, however, it may be advantageous to agitate the fabric for more or less time, such as for approximately 15-20 minutes that may allow the water repellant material to permeate through the individual fibers of the fabric. Moreover, while a 0.5% weight of water repellent material is shown above, the benefits of at least some of the embodiments may be obtained by keeping the ratio of water repellant material from 0.3% to about 0.5%.

Once agitation is complete, in step 612, the agitating device is drained and excess liquid is extracted from the fabric via conventional methods, such as via an application of centrifugal force (e.g., a spin cycle). The twice-coated fabric is then removed from the agitating device and, in step 614, placed in an environment having an elevated temperature in order to completely dry the fabric. For example, it may be advantageous to dry the material at approximately 200 degrees Fahrenheit until all excess moisture has been removed. In any event, at least some embodiments call for drying the twice-coated fabric between 190 degrees and 200 degrees Fahrenheit. In some embodiments, the drying times and temperatures may vary depending the specific fabric being treated, the altitude, the humidity, etc., however, persons skilled in the art will appreciate that too much heat or not enough heat will render the process to be ineffective The process ends at step 616.

While there have been described conductive fabrics and methods for making the same, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The described embodiments of the invention are presented for the purpose of illustration and not of limitation.

What is claimed is:

1. A method for making water repellant conductive fabrics, the method comprising:
coating a fabric with a mixture containing electrically conductive particles to make the fabric wet;
inserting the wet fabric into an agitation device loaded with a liquor containing at least a portion of water repellant substance;
agitating the wet fabric for a predetermined amount of time between approximately 15 and 20 minutes within the liquor;
extracting excess fluid from the fabric; and
the fabric after agitation; and then drying the fabric at an elevated temperature.

2. The method of claim 1, further comprising:
   assessing a surface tension of the fabric prior to coating to determine susceptibility for optimum coating penetration and adhesion.

3. The method of claim 2, wherein assessing the surface tension of the starting fabric comprises:
   measuring a wetting time required for a surface of the fabric to wet; and
   determining that the wetting time is less than 60 seconds.

4. The method of claim 1, wherein the at least a portion of water repellant substance is approximately between 0.3% and 0.5% weight of the liquor.

5. The method of claim 4, wherein the at least a portion of water repellant substance is approximately 0.5% weight of the liquor.

6. The method of claim 1, wherein a ratio of weight of the liquor to weight of the fabric being agitated is at least approximately 5 to 1.

7. The method of claim 1, wherein the elevated temperature is at least approximately 190 degrees Fahrenheit.

8. The method of claim 7, wherein the elevated temperature is approximately between 190 degrees and 200 degrees Fahrenheit.

\* \* \* \* \*